United States Patent

[11] 3,532,065

| [72] | Inventor | Nerino Marforio<br>Milan, Italy |
|---|---|---|
| [21] | Appl. No. | 758,284 |
| [22] | Filed | Sept. 9, 1968 |
| [45] | Patented | Oct. 6, 1970 |
| [73] | Assignee | S.p.A. Virginio Rimoldi & C.,<br>Milan, Italy |
| [32] | Priority | Sept. 20, 1967 |
| [33] | | Italy |
| [31] | | 20,658/67,<br>Patent 812,799 |

[54] THREAD CUTTING DEVICE FOR SEWING MACHINES
13 Claims, 15 Drawing Figs.

| [52] | U.S. Cl. | 112/252 |
|---|---|---|
| [51] | Int. Cl. | D05b 65/02 |
| [50] | Field of Search | 112/252 |

[56] References Cited
UNITED STATES PATENTS

| 2,376,417 | 5/1945 | Chudner | 112/252 |
|---|---|---|---|
| 2,681,021 | 6/1954 | Kindseth et al. | 112/252X |
| 3,139,849 | 7/1964 | Cohen et al. | 112/252 |
| 3,354,852 | 11/1967 | Kennedy et al. | 112/252 |

Primary Examiner—James R. Boler
Attorney—Stevens, Davis, Miller and Mosher

ABSTRACT: A sewing machine provided with a thread cutting device whose thread gripping and cutting members are retractably extendable into the working area of the stitching members, and including auxiliary thread tension relieving members, said cutter and auxiliary members all being actuated by respective pneumatic means which are correlated with each other.

INVENTOR
NERINO MARFORIO

BY

ATTORNEYS

THREAD CUTTING DEVICE FOR SEWING MACHINES

The present invention relates to a sewing machine having a displaceable cutter device correlated with a device for releasing the tension in the threads and with a pulling device for pulling an excess length of thread from the bobbins after the release of such tension and before the occurrence of the cutting of the threads.

Sewing machines have heretofore been provided with cutting means which included a means for feeding out a surplus length of thread just before the occurrence of the cutting operation whereby the cutting could occur at a point removed from the area of operation of the stitch forming members, said surplus length being sufficient to obviate unthreading of the thread from said stitch forming members upon recommencement of the sewing operation. In such known devices, the surplus thread length was necessary since the thread cutting occurred at a relatively large distance from the location of the stitch forming members, so that the thread had to be extended out of its normal stitching path to reach the cutting device and, in doing so, the thread would be subjected to excessive tension and consequent breakage unless the normal tension therein were relieved and an excess length thereof were pulled off the bobbins for it to reach the thread cutter.

The disadvantage inherent in having to provide such excess length of thread has been partly reduced by providing a displaceable cutter device adapted to partially extend into the area of the thread stitching members thereby reducing the distance the thread had to deviate from its normal stitching path in order to be gripped and cut by the cutter device.

Another disadvantage in known thread cutting devices was in the fact that, whenever a workpiece had been finished and it was removed from the sewing machine, the free ends of the needle threads slipped out of the cutter clamp and remained dangling from the needles so that upon recommencement of the sewing operation they were pressed between the presser-foot and the new workpiece thus being visible externally. It was not possible to cut the free ends shorter since such would result in the machine remaining unthreaded during the execution of the first stitch.

A further disadvantage in known devices was in the fact that the operation of the cutter was obtained by pneumatic means, whilst the operation of the auxiliary devices cooperating with the cutter was obtained by mechanical means, so that it was not possible to achieve a perfect synchronism of the respective movements and the correct sequence of operation of each respective device for relieving the tension on the needle and looper threads; for pulling threads from the bobbins; and, for gripping the sewing threads and carrying them against the counterblade and the clamp. Moreover, the difference between said pneumatic and mechanical means required a work speed for the shiftable cutter higher than that for the auxiliary devices, so that the cutter was not sure to receive the necessary excess thread length before the cutting occurred.

It is an aim of this invention to provide a thread cutting device, of the type mentioned, but providing synchronism of the movements and the correct sequence of the operations of the cutter and of the related auxiliary devices.

It is another aim of this invention to provide a thread cutting device as mentioned, adapted to make possible the execution of seams lacking the initial thread portions, which are withdrawn in the lower part of the work and covered by sewing stitches.

In order to achieve these aims, a cutting device has been provided whereby by acting upon a single control device, a shiftable cutter, a pneumatic cutter clamp, and related auxiliary devices are simultaneously actuated by respective driving means, all of the same kind. Specifically, a thread cutting device as mentioned has been realized, wherein a shiftable cutter and related auxiliary devices are actuated at the same time, each one by a plunger of respective pneumatic driving means, the operation of which is obtained by a single control device and wherein the operations for relieving tension and pulling the threads from the bobbins are performed before the cutting operation of the sewing threads by the cutter, the latter being actuated for cutting during the return stroke of its plunger whilst the auxiliary devices are actuated to operate during the forward stroke of their plungers. Further, a thread cutting device has been realized, in which a pneumatically operated thread clamp for gripping the threads is mounted on the overhanging bracket arm laterally of the presser foot and near the needles, the thread clamp being actuated simultaneously with the cutter and with auxiliary devices for slipping the cut needle thread out of the thread gripping clamp of said cutter, in order to grip it out of the workpiece.

A main advantage of the present thread cutting device resides in the provision of a plurality of pneumatically driven plungers of different length which, thereby, provide for delayed action of respective members relative to each other notwithstanding the fact that the plungers are simultaneously actuated.

Another advantage provided by the present thread cutting device resides in the elimination of thread portions at the beginning of seams, thereby permitting the seams to be well shaped and precisely defined.

Other aims and advantages of the present invention are those which are inherent and which will become apparent from the following detailed description of a preferred embodiment of realization which description is referred to the accompanying drawings, wherein:

Figure 1:
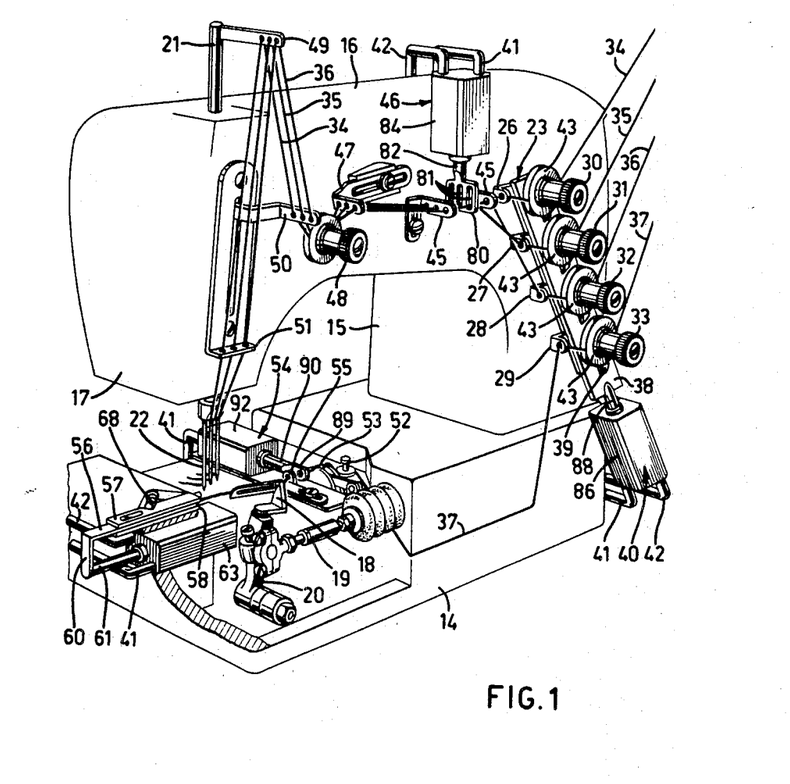
FIG. 1 is a pictorial view of a sewing machine including the thread cutting device according to this invention.

In FIG. 1 is shown a sewing machine generally comprising a bed plate 14 provided with a vertical standard 15 on which is fixed a horizontal overhanging bracket arm 16 provided on its free end with a head 17. Within the bed plate 14 is journaled a looper 18 for effecting chain stitches, which looper is actuated in a known manner by means of a connecting rod 19 and a swinging bracket 20, by the usual main shaft which is not shown in the accompanying drawings. A needle bar 21 is vertically slidably mounted within the head 17 and carries three needles 22 which, together with the looper 18, form the known members for the formation of the sewing stitches.

Externally, the sewing machine is provided with a tension unit 23 (see also FIG. 2) comprising a tension supporting plate 24 fixed in a known manner to suitable posts 25 of the standard 15. The tension supporting plate 24 is provided with thread guides 26, 27, 28, and 29 and with adjustable tensions 30, 31, 32, and 33 for tensioning needle threads 34, 35, and 36 and looper thread 37, which are supplied from the usual bobbins, not shown in the drawings. On the tension supporting plate 24, below the adjustable tensions, is mounted a slidable plate 38 provided with curved tongues 39 and connected with an auxiliary tension releasing device 40 connected in turn by conduits 41 and 42 to a pneumatic pressure source.

Figure 2:
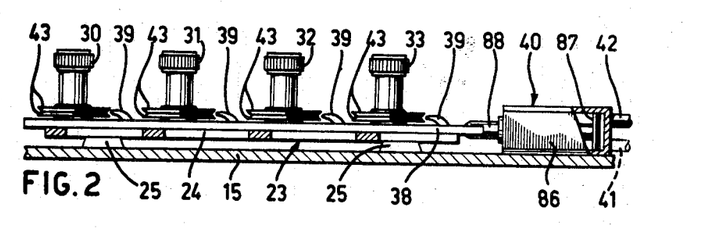
FIG. 2 is a side view of the tension unit shown on the machine of FIG. 1.

The curved tongues 39 are arranged to be wedged between disks 43 of each adjustable tension, in order to relieve the tensioning action on said needle and looper threads, when said slidable plate 38 is moved by said auxiliary tension releasing device 40. On the overhanging bracket arm 16 are provided two fixed thread guides disposed on either side of an auxiliary top thread pulling device 46 connected by conduits 41 and 42 to said pneumatic pressure source. Arm 16 also carries an auxiliary take-up 47 and a supplementary tension 48, through which the needle threads 34, 35, and 36 are guided towards the needle 22. The auxiliary take-up 47 is provided for cooperating, during the closing of the sewing stitches, with the known take-up devices 49 and 50 which are respectively fixed on the needle bar 21 and the head 17. Additionally, a thread guide 51 is mounted on said head, following the take-up 50, for properly guiding the needle threads 34, 35, and 36 onto said needles 22.

The looper thread 37 is guided firstly by the thread guide 29 and by other not shown thread guides mounted on the bed plate, and by a supplementary lower tension 52 which is located near a lower cam take-up 53 which in turn is located on the side of an auxiliary bottom thread pulling device 54 connected by conduits 41 and 42 to said pneumatic pressure source. Between looper 18 and supplementary tension 52 there is provided another fixed thread guide 55 which assures the perfect running of thread 37. The sewing machine is also provided with a shiftable cutter blade 56 which is displaceably mounted on the bed plate 14 (FIGS. 5 to 8) interposed between a movable counterblade 57 and a movable gripping clamp 58, the latter being provided for gripping the cut threads.

Figures 14, 15:
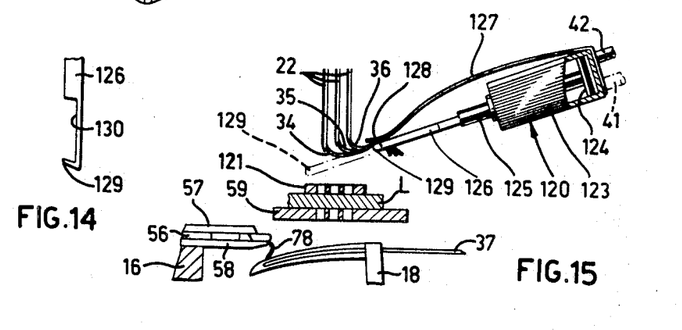
FIG. 14 is a detail view of the thread clamp.
FIG. 15 is a detail view, partially in section, of the thread cutting device according to this invention.

The cutter member 56 is usually in a rest position, in which it is located out of the stitch formation area in which the looper 18 and needles 22 operate, said member 56 being situated below the plane of the needle plate 59 (FIG. 15). The cutter member 56 is connected by a plate 60 to a rod 61 of a plunger 62 which is mounted within a cylinder 63 whose opposite ends are connected by conduits 41 and 42 to a pneumatic pressure source. The plunger 62 is pushed first in one and then in the opposite direction by compressed air admitted into said cylinder alternately through said conduits which lead into opposite ends of said cylinder so as to supply pressure to the opposite sides of the plunger 62. The cutter 56 is thereby shifted forward by compressed air, from its rest position which is illustrated by full lines in FIG. 5, to the thread catching position which is illustrated by dotted lines, whereby it extends within the stitch formation area in which the stitch forming members operate.

Figure 5:
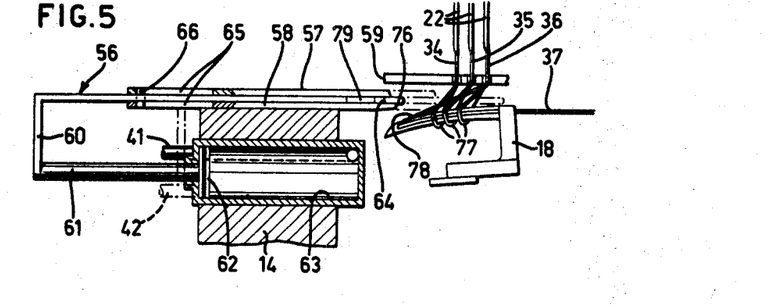
FIG. 5 is an enlarged sectional view showing the shiftable cutter and its pneumatic driving means according to this invention.

During the movement towards the thread catching position, the cutter 56 runs freely along a short extent of its own stroke thereby separating its blade portion 64 from the counterblade 57. Subsequently, the cutter 56 engages both counterblade 57 and clamp 58 to move them as near as possible to the sewing threads which are to be caught and, vice versa, during the movement towards the rest position the cutter runs freely backwards carrying the threads caught by said blade 64 to the counterblade and the clamp, which remain in the previously reached position in order to grip and cut said threads before beginning to move together with said cutter towards the rest position. For obtaining the above-described sequence of movements, the counterblade 57 and the clamp 58 are provided each with an elongated closed end slot 65 which is as long as the free run extent of the cutter 56, which in turn is provided with a pin 66 extending transversely from both sides of said cutter and having each outer end thereof slidingly engaged within the respective slot 65.

At first, when the cutter 56 is in the rest position, the pin 66 lies at the extreme left end of the slots 65 (FIG. 6) so that the cutter 56 can travel to the right for the full length of the slots 65 independently of the counterblade 57 and the clamp 58, these members being then driven by the cutter for the remaining extent of its stroke to the right from their rest to the cutting position. Conversely, during the return stroke from the thread catching position to the rest position, the cutter 56 runs free for the full length of slots 65 since pin 66 must travel from right to left said full length before the pin 66 abuts against the left end of slots 65 whereby cutter 56 begins to drive the counterblade 57 and clamp 58 back to the rest position.

In order to avoid that the counterblade and clamp are dragged by the cutter through friction therebetween before the pin 66 has traveled the full length of slots 65, there is provided a detent means 68 (FIGS. 6 to 8) comprising a spring 69 interposed between two semispherical members 70 and 71 which are housed within recess 72 formed in the upper part of bed plate 14. Member 70 is engaged in a semispherical wall 73 which constitutes a fulcrum for said detent means 68 while the member 71 is engaged in a pair of aligned notches 74 formed along one side of the counterblade 57 and clamp 58 adjacent to the recess 72. To avoid interference with member 71, cutter 56 is formed with a notch 75 laterally aligned with said notches 74, and extending lengthwise to an extent slightly greater than the length of slot 65.

Figure 6:
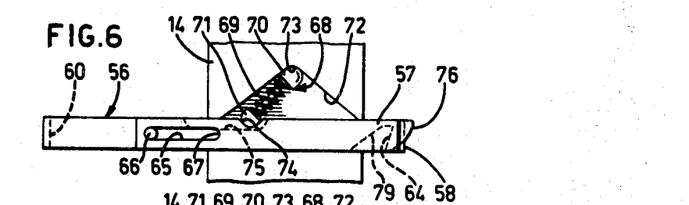
FIGS. 6, 7, and 8 are views each showing the cutter of this invention in successive positions thereof.
Figure 7:
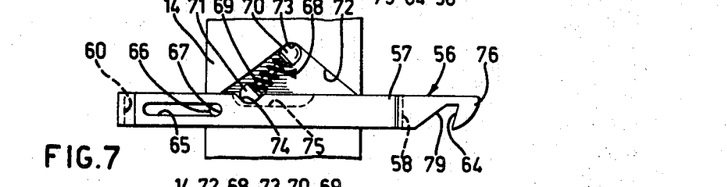
Figure 8:
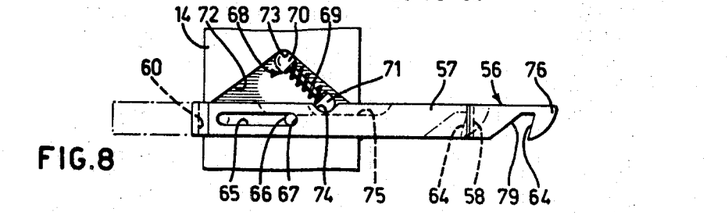
Figure 9:
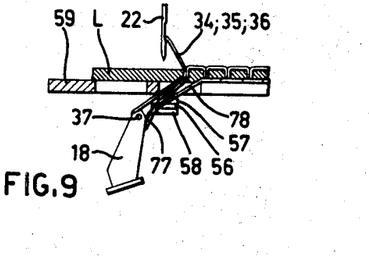
FIGS. 9, 10, and 11 are frontal views showing the different dispositions of the threads during respective intervals of the cutting action thereon.
Figure 10:
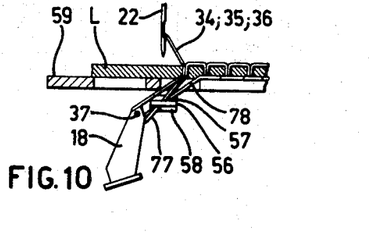
Figure 11:
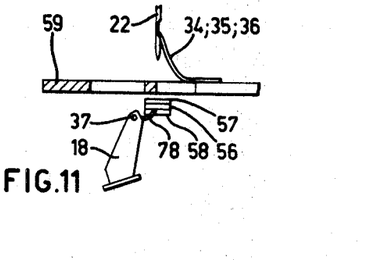

Detent means 68, therefore, constitutes a resiliently yieldable restraining means (the semispherical member 71 being axially displaceable towards member 70 against the compression of spring 69) acting upon the counterblade 57 and clamp 58 to prevent them from being frictionally dragged along by cutter 56 in either direction until pin 66 abuts against an end of slots 65, whereupon cutter 56 will positively drive said counterblade and clamp with detent means 68 correspondingly pivoting about wall portion 73 and semispherical member 71 moving axially against the urging of spring 69.

Cutter 56 is adapted to grip the threads by means of the hook 76 formed at the free end of its blade portion 64. Specifically, when cutter 56 is advanced from its rest position into the area in which the stitching members operate (see FIGS. 5, 8, 9, and 10), the curved outer edge of blade 64 first pushes the threads (between workpiece L and looper 18) aside whereupon they slip into notch 79 behind said curved outer edge. Subsequently, cutter 56 performs its return stroke pulling the threads with the flat back edge of hook portion 76 to clamp 58 which grips them and, successively, against counterblade 57 which cuts them, it being noted that clamp 58 protrudes longitudinally towards the threads beyond the end of counterblade 57. After being cut, the threads are continued to be pulled away from the stitch formation area by the clamp 58 until it reaches its rest position.

The gripping of the threads by cutter 56 occurs while thread portions 77 and 78 extend between looper 18 and workpiece L while looper 18 is laterally displaced from the reciprocation axis of needles 22 which are themselves stopped at their top dead-center position while workpiece L has completed its travel past said axis. In order to obviate, therefore, an excessive increase in the thread tension and possible untimely thread breakage because of the cutter pulling thereon, auxiliary tension releasing and thread pulling devices 40, 46, and 54 are provided which act to relieve the thread tension and also to feed a certain surplus length of thread from the respective bobbins to cutter 56 before the cutting operation occurs.

Figure 3:
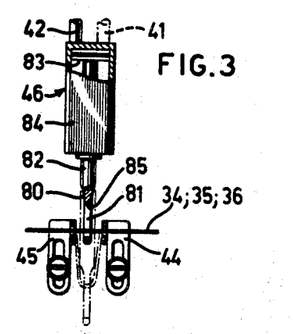
FIGS. 3 and 4 are detail views of the auxiliary thread pulling devices, respectively, for the needle and hook threads, which also are shown in FIG. 1.

The top thread pulling device 46 (FIGS. 1 and 3) comprises a pneumatic cylinder 84 whose opposite ends are communicated with a source of pressurized air through respective conduits 41 and 42. A double acting plunger piston 83 is reciprocable within the cylinder in either direction in correspondence to said air being fed into either end of the cylinder. Reciprocably integral with piston 83 is a rod 82 whose external end carries a plate 80 having an individual elongate slot 81 for each of the needle threads, respectively, the slots 81 extending in the same direction as the axis of cylinder 84. Plate 80 is, therefore, reciprocable at a location between the thread guides 45 and in a direction transverse to the extent of the needle threads 34, 35, and 36 which extend through said guides and through the slots 81. Plate 80 is axially displaceable from the position thereof shown in FIG. 1 to a position whereby threads 34 to 36 are caused to follow an angled path (one end of slots 81 constituting the apex thereof) in the extent thereof between the stationary guides 45. Since slots 81 are elongated, plate 80 is free to reciprocate to a certain extent without affecting the threads, this constituting a time delay factor between initial actuation of means 46 and the actual displacement of the threads by plate 80. Given a simultaneous actuation of the thread cutting device 63 and of the tension reliever devices 46 and 40, said delay factor serves to permit complete release of the tension in threads 34 to 36 before plate 80 acts to pull an excess length of said threads from their respective bobbins, thereby avoiding thread breakage or excessive pulling on the already formed stitches.

Auxiliary tension releasing device 40 is analogous to device 46 and also comprises a pneumatic cylinder 86 within which a double acting plunger piston 87 is reciprocable, said piston being reciprocably integral with rod 88 which exteriorly is connected to the slidable plate 38 (FIGS. 1 and 2). Piston 87 is displaceable in either direction in correspondence to pressurized air being fed into either end of said cylinder 86 through respective conduits 41 and 42. Pursuant to displacement of piston 87 from its FIG. 2 position, tongues 39 carried by plate 38 are wedged against disks 43 thereby restoring tension on the needle threads 34 to 36.

Figure 4:
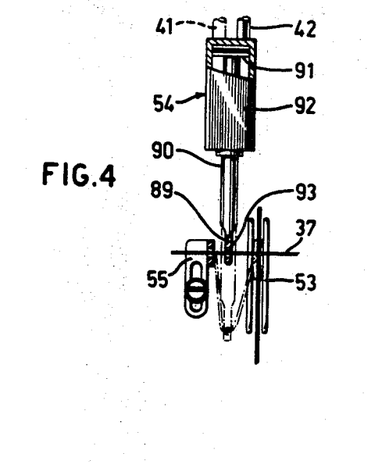

Auxiliary thread pulling device 54 (FIGS. 1 and 4) for the bottom thread 37 also is analogous to the afore-described pulling devices 40 and 46 in that it comprises a pneumatic cylinder 92 into whose opposite ends lead the conduits 41 and 42, respectively, for reciprocating the double acting plunger piston 91 which is integral with rod 90 which, in turn, exteriorly carries a plate 89 having a hole 93 extending therethrough for passage of thread 37 from lower cam take-up 53 to fixed guide 55. As is seen in phantom lines in FIG. 4, piston 91 is displaceable to a position whereby plate 89 constrains thread 37 to follow an angled path between take-up 53 and guide 55. Since the normal working tension on thread 37 is usually very slight, pulling device 54 may effect its pulling action on thread 37 simultaneously with the release of tension on said thread which occurs upon actuation of device 40, and for this reason it is not necessary to incorporate a time delay factor into the operation of device 54 as was done with reference to device 46.

The sewing machine is conventionally driven by an electric motor of known type, and, therefore, not shown, through a mechanical clutch for high speed actuation combined with a low speed actuation device. Said motor is connected to an electric control system provided with stop means for stopping the sewing machine with the needle bar stopped in a predetermined position, i.e., with needle bar at its bottom dead-center (needle in lowermost position), and with means for varying said stop needle bar position (needle in uppermost position) in correspondence to which the thread cutting device, which is the object of the present invention, can be automatically actuated. The uppermost needle position is essential to perform the thread cutting and to avoid interference between cutter 56 and needles 22.

Figure 12:
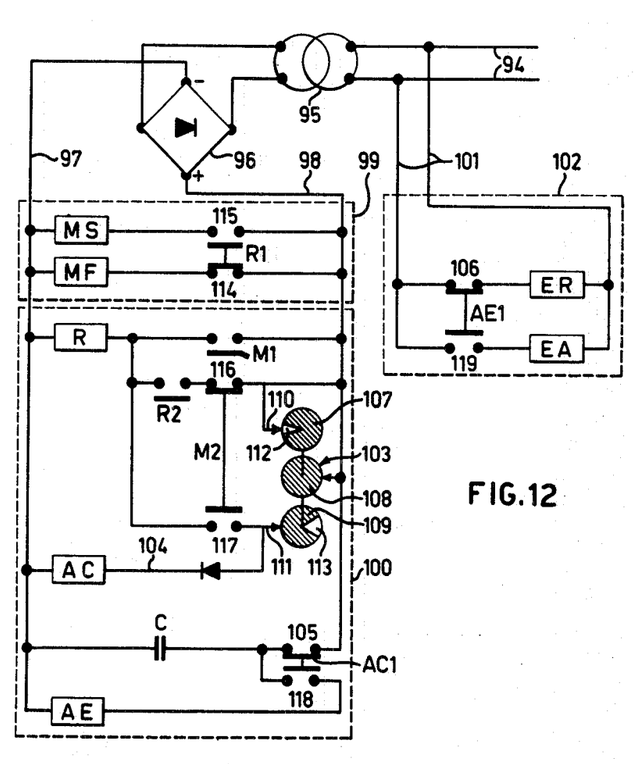
FIG. 12 is a diagrammatic showing of the electrical control circuit for the sewing machine of FIG. 1.

The electric control system which is diagrammatically represented in FIG. 12 is connected to the usual power source by two wires 94 and comprises a transformer 95 and a rectifier 96 the output of which is connected by two wires 97 and 98 to a low speed actuation device 99 and to stop means 100. Pneumatic control means 102 for cutter 56 and the auxiliary devices 40, 46, and 54 are connected by wires 101 to the pair of wires 94. When the wires 94 are energized by an electric current, also wires 97 and 98 are energized and thus the electric current passes through the circuit formed by a rotary switch 103 and wire 104 and excites the coil of a relay AC.

The excitation of relay AC causes the closing of a contact AC1 against contacts 105 through which passes the charge current for condenser C provided for actuating said pneumatic control means 102 by its own discharge current. At the same time, through the wires 101 and a contact AE1 which is closed against contacts 106 passes the excitation current for an electrovalve ER of said pneumatic control means. The electrovalve ER is provided for admitting compressed air from a source thereof into cylinders 63, 84, 86, and 92 by means of conduits 41 for causing the corresponding plungers to perform their return stroke towards their own rest position and to keep them in such position during the sewing operation of the machine.

The rotary switch 103, of a type already known in the art, comprises generally three conductor rings 107, 108, and 109 which are keyed on the sewing machine main shaft, and two electric brushes 110 and 111 which ride against the two outer rings 107 and 109. The outer rings 107 and 109 are formed each with a short insulated sector 112 and 113 which are disposed diametrically opposite to each other and synchronized with the needle bar in such a way that the latter is at bottom dead-center when the insulated sector 112 is connected to brush 110 and is at top dead-center when the insulated sector 113 is connected to electric brush 111.

The starting of the sewing machine is effected by the operator actuating a suitable control not shown, as i.e., a treadle, which by its movement in one direction causes the mechanical clutching of the motor and the closing of a microswitch M1 through which passes the excitation current for a relay R. The excitation of relay R causes, in the low speed actuation device 99, the movement of a contact R1 from contacts 114, with which it is usually in contact, onto the contacts 115 through which passes the excitation current for an electromagnet MS causing the starting of the above mentioned low speed actuation device. At the same time, the relay R closes its other contact R2, in the stop means 100, whereby R is self-excited even after the opening of microswitch M1 in order to effect the needle bar positioning.

The stopping of the sewing machine is effected by the operator actuating a suitable control which interrupts the driving of the machine by the motor and which brings about the opening of microswitch M1. The relay R, however, is kept excited by current passing through the rotary switch 103 and a microswitch M2 closed against contacts 116, and the contact R2. The sewing machine is not stopped completely but continues its rotation being actuated by the low speed actuation means until the insulated sector 112 of rotary switch 103 comes into contact with electric brush 110, thereby interrupting the current flow. At this time, the relay R is de-excited and causes the opening of contact R2 and moves contact R1 from contacts 115 onto contacts 114. This results in the de-excitation of electromagnet MS which disengages the sewing machine from the low speed actuation means and at the same time causes the excitation of an electromagnet MF which causes the instantaneous stoppage of the sewing machine with the needle bar at bottom dead-center. Upon reactuation by the operator of the starting control means, the machine again starts to run as previously.

If the actuation of the thread cutting device is desired, it is necessary for the operator to actuate the starting control means in opposite direction to the starting direction in order to avoid mechanical clutching of the machine with the motor and the closing of microswitch M. The reverse movement of said starting control moves the microswitch M2 from contacts 116 onto contacts 117. Since the sewing machine is stopped with the conductive portion of outer ring 109 in contact with the electric brush 111, the closing of microswitch M2 onto contacts 117 causes the excitation of relay R which closes the contact R2 and moves the contact R1 from contact 114 onto contacts 115 causing the low speed actuation means to actuate the machine. As soon as insulated sector 113 contacts electric brush 111, consequent interruption of current to said relay R causes contact R1 to move onto contacts 114 and, as above explained, causes the machine stoppage. At this moment, the machine is stopped with the needle bar at top dead-center, namely: with the needles 22 completely out of the work.

The interruption of current flow from outer ring 109 to electric brush 111 causes also the de-excitation of relay AC which moves the contact AC1 from the contacts 105 onto contacts 118 through which passes the discharge current of condenser C. Said discharge current excites for a short time the relay AE which moves the contact AE1 from contacts 106 of said pneumatic control means onto contacts 119 and this corresponds to the automatic actuation of the thread cutting device. The opening of contacts 106 causes the de-excitation of electrovalve ER which discharges to atmosphere the compressed air contained in the cylinders of the cutter and auxiliary devices. The closing of contacts 119 causes the excitation of an electrovalve EA which admits compressed air into said cylinders through conduits 42 which lead into the ends of said cylinders opposite to ducts 41. The plungers are thereby pushed forward, thus causing the catching of the sewing threads by cutter 56, the relieving of tension on said threads by auxiliary tension releasing device 40 and the pulling of excess thread lengths from the bobbins by the auxiliary pulling devices 46 and 54. As soon as the discharge current of condenser C is exhausted, the relay AE becomes de-excited bringing again the contact AE1 onto contacts 106 and consequently the electrovalve EA causes the venting to atmosphere of the compressed air contained in the cylinders, and the electrovalve ER is excited by closing of contact AE1 onto contacts 106 causing the admittance of compressed air into said cylinders through conduits 41. The plungers are thereby pushed backwards causing the gripping and cutting of the threads by cutter 56, the restoring of tension on said threads by auxiliary tension releasing device 40, and the provision of surplus thread to cutter 56 by auxiliary pulling devices 46 and 54.

After the action of the thread cutting device is carried out, the workpiece can be removed from the sewing machine or moved for being sewn on other areas thereof. The needle thread portions which extend from said workpiece and are gripped by thread clamp 58 below the needle plate 59, are slipped out of the clamp and remain dangling from the needles 22 so that it is possible for said threads to be pulled through the needles' eyes prior to commencing a subsequent seam.

When a new workpiece to be sewn is placed onto the sewing machine, the dangling needle threads are normally disposed below the presser foot shoe in the feeding direction and the presser foot pressure so keeps them during the beginning of a new seam with the result that the needle threads are visible externally, it being very unlikely that they will be covered by stitches formed on the new workpiece. For obviating the above, the thread cutter device is provided with a pneumatic thread clamp 120 (FIGS. 13 to 15) which is provided for gripping the needle threads 34, 35, and 36 after they are cut by the cutter and slipped out of the workpiece L.

Figure 13:
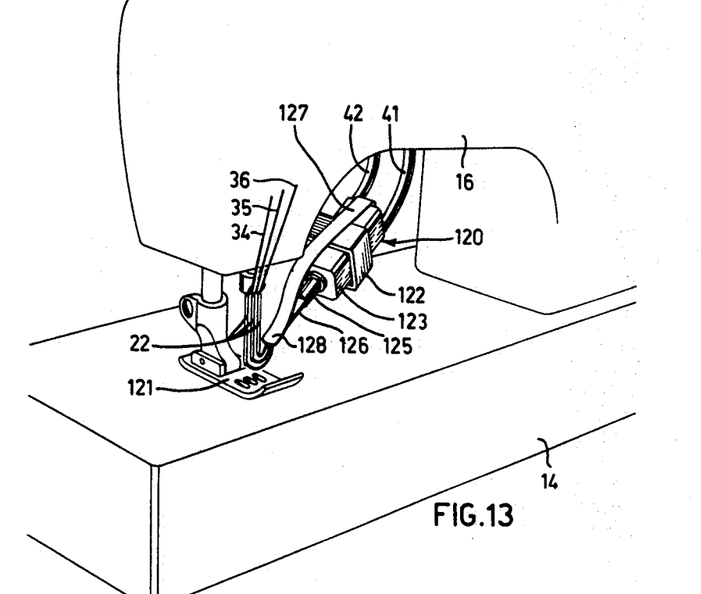
FIG. 13 is an enlarged pictorial view of a portion of the machine of FIG. 1 showing details of the pneumatically driven thread clamp.

The pneumatically operated clamp 120 is mounted on the sewing machine below the overhanging bracket arm 16 laterally of the conventional presser foot 121 and near the vertical paths of needles 22. Said pneumatic clamp works in the space comprised between the presser foot shoe and the needle points which are stopped in their uppermost position. Said clamp 120 is fixed to overhanging bracket arm 16 by a bracket 122 and comprises a cylinder 123 within which is mounted a reciprocable plunger 124 integral with a rod 125 on the free end of which is a thread catching hook 126. The latter is provided for catching the dangling ends of needle threads 34, 35, and 36 extending between needles 22 and clamp 58 after the cutter 56 has cut them.

A plate 127 fixed to cylinder 123 includes a free end 128 lightly urging said hook 126 to grip the needle threads 34, 35, and 36 after they have been slipped out of the workpiece L. The hook 126 is formed with a hook end 129 and gap 130 into which the needle threads slip when hook 126 has completed its forward stroke. Point 129 catches the needle threads during the return stroke of said hook in order to bring them to between the free end 128 and said hook, the threads being gripped therebetween.

The hook 126 performs its reverse stroke, during which it pulls the threads toward free end 128, simultaneously with the occurrence of the cutting (return) stroke of cutter 56 without, however, interfering with the cutting action or with the integrity of the already formed stitches since, the extent to which cutter 56 runs free of counterblade 57 is very short while the forward stroke of hook member 126 carries hook point 129 beyond the thread position to an extent whereby the cutter 56 performs its cutting action just before the hook point 129 engages the threads on its return stroke.

The herein presented details of a preferred embodiment of realization are not limitative but only illustrative of the scope of applicability of the disclosed inventive concept, said concept being adaptable to various modifications and substitutions which are obvious or well within the purview of one skilled in the art.

I claim:

1. A sewing machine comprising a thread tensioning means, stitching members including a reciprocable needle, a cutter means for cutting the sewing thread upon completion of a sewing operation, a thread tension releasing means and a thread pulling means respectively for releasing the tension in the sewing thread between the thread machine bobbin means and stitching members and for pulling an excess length of thread from the machine bobbin means, said releasing and pulling and cutting means including respective members which are reciprocable from a rest position along a forward stroke and back to said rest position along a return stroke for acting upon said sewing thread, spaced apart thread guides defining a path for thread from said tensioning means to said needle, an upper said thread pulling means being positioned in said path between two said guides and including a said reciprocable member which is arranged to reciprocate along an axis transverse to the said thread path extending between said two guides, the last-mentioned member including an enlarged slot extending in the same direction as said axis and arranged to permit a thread to pass therethrough along said path, one end of said slot being substantially aligned with said thread path in correspondence to the last-mentioned member being in said rest position thereof, the length of the forward stroke of the last-mentioned reciprocable member being of a length substantially greater than the length of said slot whereby the other end of said slot is adapted to abut against a thread extending along said path between said guides to cause the thread to follow an angled path between said guides pursuant to said last-mentioned member performing said forward stroke thereof, the length of said slot constituting a portion of said forward stroke thereof, during which the thread is unaffected by movement of the reciprocable member.

2. The sewing machine of claim 1, wherein the said forward stroke of said last-mentioned reciprocable member is adapted to result in the pulling of thread from a thread bobbin mounted on said tensioning means, and the said return stroke of said last-mentioned member results in the release thereof of the thread.

3. The sewing machine of claim 1, including a plurality of sewing needles mounted on a common needle bar and each one being adapted to receive its own needle thread, the reciprocable member of said upper pulling means including a number of said slots equal to the number of said needles, the slots being parallel and adjacent to each other.

4. A sewing machine comprising a thread tensioning means, stitching members including a reciprocable needle, a cutter means for cutting the sewing thread upon completion of a sewing operation, a thread tension releasing means and a thread pulling means respectively for releasing the tension in the sewing thread between the thread machine bobbin means and stitching members and for pulling an excess length of thread from the machine bobbin means, said releasing and pulling and cutting means including respective members which are reciprocable from a rest position along a forward stroke and back to said rest position along a return stroke for acting upon said sewing thread, a spaced apart thread guide means defining a path for thread from said tensioning means to said needle, an upper said thread pulling means being positioned in said path between two said guides and including a said reciprocable member which is arranged to reciprocate along an axis transverse to the said thread path extending between said two guides, the last-mentioned member including an elongate slot extending in the same direction as said axis and arranged to permit a thread to pass therethrough along said path, one end of said slot being substantially aligned with said thread path in correspondence to the last mentioned member being in said rest position thereof, the length of the forward stroke of the last-mentioned reciprocable member being substantially greater than the length of said slot whereby the other end of said slot is adapted to abut against a thread extending along said path between said guides to cause the thread to follow an angled path between said guides pursuant to said last-mentioned member performing said forward stroke thereof, a pneumatic drive means common to all aforementioned reciprocable members for driving said reciprocable members, a control means for actuating said pneumatic drive means.

5. The sewing machine of claim 4, said pneumatic drive means comprising respective pneumatic cylinders each having a double acting piston therein, a conduit means leading into opposite ends of each cylinder from a source of pressurized air, said control means comprising electrically operated valve means in said conduit means for simultaneously connecting one end of each cylinder to said source while simultaneously connecting the opposite end of each cylinder to atmosphere and alternately reversing the aforementioned relationship with regard to the opposite ends of each cylinder.

6. The sewing machine of claim 5, said conduit means including a separate conduit leading from a said source of pressurized air into a respective one end of each said cylinder, a said valve in each said conduit, a single operator actuable control device for actuating said valves, said valves being arranged to vent one of said conduits to atmosphere while simultaneously connecting the other to said source and vice versa.

7. The sewing machine of claim 4, said control means comprising an electrical control circuit including machine drive actuation means and machine stoppage actuation means and further including a rotary switch which, in correspondence to either a first or second position thereof, is adapted to activate said stoppage actuation means with the sewing needle in respectively a lower or upper reciprocable position thereof, an electrically operated valve means for controlling said pneumatic drive means, a condenser arranged to be charged in correspondence to said rotary switch being in said first position thereof and arranged to discharge its current to said valve means in correspondence to said rotary switch being in said second position thereof, said valve means normally assuming a first position in correspondence to its receiving no current from said condenser whereby said pneumatic drive means is actuated to drive said reciprocable members to said rest position thereof, said valve means assuming a second position in correspondence to discharge thereto of current from said condenser whereby said pneumatic drive means is actuated to drive said reciprocable members along said forward stroke thereof.

8. The sewing machine of claim 7, said control circuit including an operator actuated switch means movable to either of two positions which respectively align said circuit for activation of said stoppage actuation means with the sewing needle in said lower and said upper position thereof, respectively.

9. The sewing machine of claim 8, said rotary switch means comprising first and second rotatable disks, said operator actuable switch means in said first and second positions thereof coacting with a different one of said disks, respectively, for activating said stoppage actuation means.

10. The sewing machine of claim 4, including a needle thread clamping member, a pneumatic drive means for reciprocably driving said clamping member, in a direction transverse to the axis of said needle and in the region between the needle plate and the needle with the latter in an upper position thereof, this last mentioned pneumatic drive means also being actuated by said control means whereby said clamping member is driven from a rest position along a forward stroke to a position beneath said needle and back to said rest position along a return stroke simultaneously with the respective forward and return strokes of said reciprocable members of said releasing and pulling means.

11. The sewing machine of claim 10, said clamp member including a hook end for gripping a thread depending from said needle, a plate member having a free end resiliently bearing against an upper surface of said clamp member, said clamp member being reciprocable relative to said plate member with said upper surface being in sliding contact against said plate free end and to an extent whereby said hook end slides along said free end during the return stroke of said clamp member whereupon a thread held by said hook end is clamped between said hook end and said plate free end.

12. The sewing machine of claim 4, including a looper adapted to receive a looper thread, and including a lower thread pulling means having a said reciprocable member arranged to reciprocate along an axis transverse to a rectilinear extent of the looper thread path ahead of said looper, the reciprocable member of said lower means including an opening through which the looper thread is adapted to pass while extending along said path extent, said opening being aligned along said path extent in accordance with said lower means member being in an at-rest position, said lower means member being reciprocable along a forward stroke from said rest position thereof thereby displacing said opening to define the apex of an angled path for the looper thread between the ends of said path extent, said lower means member being reciprocable along a return stroke back to said rest position thereof, said lower pulling means member also being driven by said pneumatic drive means whereby it performs its said forward and return strokes simultaneously with the performance of the corresponding strokes by the other mentioned reciprocable members.

13. A sewing machine comprising a thread tensioning means, stitching members including a reciprocable needle, a cutter means for cutting the sewing thread upon completion of a sewing operation, a thread tension releasing means and a thread pulling means respectively for releasing the tension in the sewing thread between the thread machine bobbin means and stitching members and for pulling an excess length of thread from the machine bobbin means, a needle thread clamping means for gripping a thread depending from said needle upon completion of a cutting operation, each of said releasing and pulling and cutting and clamping means comprising a pneumatic cylinder having a double acting piston and rod reciprocable along forward and return strokes, respectively, a conduit leading into opposite ends of each cylinder from a source of pressurized air, said common control comprising a first common valve means controlling all the conduits leading into one end of the cylinders and a second common valve means controlling all the conduits leading into the other end of the cylinders, said first and second valve means being correlated with each other whereby one admits pressurized air from said source into one end of all the cylinders while the other vents air from the other end of said cylinders, and vice versa.